United States Patent
Gudem et al.

(10) Patent No.: US 8,975,966 B2
(45) Date of Patent: Mar. 10, 2015

(54) SHARED BYPASS CAPACITOR MATCHING NETWORK

(75) Inventors: Prasad Srinivasa Siva Gudem, San Diego, CA (US); Ojas M. Choksi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 56 days.

(21) Appl. No.: 13/413,897

(22) Filed: Mar. 7, 2012

(65) Prior Publication Data

US 2013/0234799 A1     Sep. 12, 2013

(51) Int. Cl.
*H03F 3/191*     (2006.01)

(52) U.S. Cl.
USPC ........................................... 330/302; 330/295

(58) Field of Classification Search
USPC ................................. 330/124 R, 286, 295, 302
See application file for complete search history.

(56) References Cited

U.S. PATENT DOCUMENTS

| | | | |
|---|---|---|---|
| 5,357,213 A * | 10/1994 | Michel et al. | 330/286 |
| 5,973,557 A | 10/1999 | Miyaji et al. | |
| 6,006,080 A * | 12/1999 | Kato et al. | 455/323 |
| 6,985,698 B2 | 1/2006 | Aggarwal et al. | |
| 7,138,862 B2 * | 11/2006 | Araki et al. | 330/126 |
| 7,170,353 B2 * | 1/2007 | Amano | 330/295 |
| 7,221,221 B2 * | 5/2007 | Bouny | 330/149 |
| 7,719,352 B2 | 5/2010 | Kim et al. | |
| 7,991,375 B2 | 8/2011 | Afsahi | |
| 8,000,737 B2 | 8/2011 | Caimi et al. | |
| 8,253,495 B2 * | 8/2012 | Bouisse | 330/295 |
| 8,416,024 B2 * | 4/2013 | Fujii | 330/302 |
| 2003/0025555 A1 * | 2/2003 | Ohnishi et al. | 330/124 R |
| 2009/0068963 A1 | 3/2009 | Cabanillas et al. | |
| 2010/0253435 A1 * | 10/2010 | Ichitsubo et al. | 330/295 |

FOREIGN PATENT DOCUMENTS

EP         0837559 A1     4/1998

OTHER PUBLICATIONS

International Search Report and Written Opinion—PCT/US2013/029705—ISA/EPO—May 29, 2013.

* cited by examiner

*Primary Examiner* — Khanh V Nguyen (57) ABSTRACT

A receiver is described. The receiver includes a first amplifier on an integrated circuit. The receiver also includes a second amplifier on the integrated circuit. The receiver further includes a first inductor coupled to the first amplifier. The receiver also includes a second inductor coupled to the second amplifier. The receiver further includes a first capacitor coupled to the first inductor, the second inductor, and to ground. The first capacitor is shared between a first matching network for the first amplifier and a second matching network for the second amplifier.

32 Claims, 8 Drawing Sheets

SHARED BYPASS CAPACITOR MATCHING NETWORK

TECHNICAL FIELD

The present disclosure relates generally to electronic communications. More specifically, the present disclosure relates to systems and methods for a shared bypass capacitor matching network.

BACKGROUND

Wireless communication systems are widely deployed to provide various types of communication content such as voice, video, data, and so on. These systems may be multiple-access systems capable of supporting simultaneous communication of multiple terminals with one or more base stations.

A terminal or a base station may include one or more integrated circuits. These integrated circuits may include analog and digital circuitry necessary for wireless communication. Such circuitry may include inductors and capacitors. As the technology used to build integrated circuits progresses, active elements on the integrated circuit such as transistors continue to decrease in size. Passive elements on the integrated circuit such as inductors and capacitors may not decrease in size relative to the active elements. Therefore, integrated circuits built with progressive technology may require increasing percentages of area on the integrated circuit for passive elements.

As terminals and base stations become more expensive, designers look to reduce costs by reducing the number of components and/or the board area used by components. If a component can be removed or shared, the cost of the terminal and/or the base station may be reduced. Benefits may be realized by removing redundant components from circuits within a terminal or a base station.

SUMMARY

A receiver is described. The receiver includes a first amplifier on an integrated circuit. The receiver also includes a second amplifier on the integrated circuit. The receiver further includes a first inductor coupled to the first amplifier. The receiver also includes a second inductor coupled to the second amplifier. The receiver further includes a first capacitor coupled to the first inductor, the second inductor, and to ground. The first capacitor is shared between a first matching network for the first amplifier and a second matching network for the second amplifier.

The first inductor and the second inductor may be shunt inductors. The first capacitor may be a shared bypass capacitor. A first input may be coupled to the first amplifier and a second input may be coupled to the second amplifier. The first input may be coupled to a first duplexer. The second input may be coupled to a second duplexer. The first duplexer and the second duplexer may be coupled to an antenna via a switch.

The receiver may include a third inductor that is coupled between a first input and the first amplifier. The receiver may also include a fourth inductor that is coupled between a first input and the second amplifier. The first amplifier and the second amplifier may both be low noise amplifiers. The first amplifier may be one of a highband low noise amplifier, a midband low noise amplifier, and a lowband low noise amplifier. The second amplifier may be one of a highband low noise amplifier, a midband low noise amplifier, and a lowband low noise amplifier.

The receiver may be part of a base station or part of a wireless communication device. The receiver may be used to receive radio frequency signals. The first inductor, the second inductor and the first capacitor may form an impedance matching network.

The receiver may include a third amplifier on the integrated circuit. The receiver may also include a fourth amplifier on the integrated circuit. The receiver may further include a third inductor coupled to the third amplifier. The receiver may also include a fourth inductor coupled to the fourth amplifier. The receiver may further include a second capacitor coupled to the third inductor, the fourth inductor, and to ground.

A method for impedance matching is also described. A signal is received from a source. The signal requires impedance matching between the source and a load. The signal is provided to an impedance matching network that shares a first capacitor for multiple amplifiers. An output of the impedance matching network is provided to one of the amplifiers.

The multiple amplifiers may be on an integrated circuit. The first capacitor may be a shared bypass capacitor. The method may be performed by an electronic device.

An apparatus is described. The apparatus includes means for receiving a signal from a source. The signal requires impedance matching between the source and a load. The apparatus also includes means for providing the signal to an impedance matching network. The impedance matching network shares a first capacitor for multiple amplifiers. The apparatus further includes means for providing an output of the impedance matching network to one of the amplifiers.

A computer-program product for impedance matching is described. The computer-program product includes a non-transitory computer-readable medium having instructions thereon. The instructions include code for causing an electronic device to receive a signal from a source. The signal requires impedance matching between the source and a load. The instructions also include code for causing the electronic device to provide the signal to an impedance matching network. The impedance matching network shares a first capacitor for multiple amplifiers. The instructions further include code for causing the electronic device to provide an output of the impedance matching network to one of the amplifiers.

DETAILED DESCRIPTION

The $3^{rd}$ Generation Partnership Project (3GPP) is a collaboration between groups of telecommunications associations that aims to define a globally applicable 3$^{rd}$ generation (3G) mobile phone specification. 3GPP Long Term Evolution (LTE) is a 3GPP project aimed at improving the Universal Mobile Telecommunications System (UMTS) mobile phone standard. The 3GPP may define specifications for the next generation of mobile networks, mobile systems and mobile devices. In 3GPP LTE, a mobile station or device may be referred to as a "user equipment" (UE).

3GPP specifications are based on evolved Global System for Mobile Communications (GSM) specifications, which are generally known as the Universal Mobile Telecommunications System (UMTS). 3GPP standards are structured as releases. Discussion of 3GPP thus frequently refers to the functionality in one release or another. For example, Release 99 specifies the first UMTS third generation (3G) networks, incorporating a code division multiple access (CDMA) air interface. Release 6 integrates operation with wireless local area networks (LAN) networks and adds High Speed Uplink Packet Access (HSUPA). Release 8 introduces dual downlink carriers and Release 9 extends dual carrier operation to uplink for UMTS.

CDMA2000 is a family of third generation (3G) technology standards that use code division multiple access (CDMA) to send voice, data and signaling between wireless devices. CDMA2000 may include CDMA2000 1X, CDMA2000 EV-DO Rev. 0, CDMA2000 EV-DO Rev. A and CDMA2000 EV-DO Rev. B. 1× or 1×RTT refers to the core CDMA2000 wireless air interface standard. 1× more specifically refers to 1 times Radio Transmission Technology and indicates the same radio frequency (RF) bandwidth as used in IS-95. 1×RTT adds 64 additional traffic channels to the forward link. EV-DO refers to Evolution-Data Optimized. EV-DO is a telecommunications standard for the wireless transmission of data through radio signals.

A base station is a station that communicates with one or more wireless communication devices. A base station may also be referred to as, and may include some or all of the functionality of, an access point, a broadcast transmitter, a NodeB, an evolved NodeB, etc. Each base station provides communication coverage for a particular geographic area. A base station may provide communication coverage for one or more wireless communication devices. The term "cell" can refer to a base station and/or its coverage area depending on the context in which the term is used.

A wireless communication device may also be referred to as, and may include some or all of the functionality of, a terminal, an access terminal, a user equipment (UE), a subscriber unit, a station, etc. A wireless communication device may be a cellular phone, a personal digital assistant (PDA), a wireless device, a wireless modem, a handheld device, a laptop computer, etc.

Communications in a wireless system (e.g., a multiple-access system) may be achieved through transmissions over a wireless link. Such a communication link may be established via a single-input and single-output (SISO), multiple-input and single-output (MISO) or a multiple-input and multiple-output (MIMO) system. A multiple-input and multiple-output (MIMO) system includes transmitter(s) and receiver(s) equipped, respectively, with multiple (NT) transmit antennas and multiple (NR) receive antennas for data transmission. The multiple-input and multiple-output (MIMO) system can provide improved performance (e.g., higher throughput, greater capacity or improved reliability) if the additional dimensionalities created by the multiple transmit and receive antennas are utilized.

A wireless communication system may utilize both multiple-input and single-output (MISO) and multiple-input and multiple-output (MIMO). A wireless communication system may be a multiple-access system capable of supporting communication with multiple wireless communication devices by sharing the available system resources (e.g., bandwidth and transmit power). Examples of such multiple-access systems include code division multiple access (CDMA) systems, wideband code division multiple access (W-CDMA) systems, time division multiple access (TDMA) systems, frequency division multiple access (FDMA) systems, orthogonal frequency division multiple access (OFDMA) systems, single-carrier frequency division multiple access (SC-FDMA) systems, 3$^{rd}$ Generation Partnership Project (3GPP) Long Term Evolution (LTE) systems and spatial division multiple access (SDMA) systems.

The terms "networks" and "systems" are often used interchangeably. A CDMA network may implement a radio technology such as Universal Terrestrial Radio Access (UTRA), cdma2000, etc. UTRA includes W-CDMA and Low Chip Rate (LCR) while cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDMA, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). For clarity, certain aspects of the techniques are described below for LTE, and LTE terminology is used in much of the description below.

Figure 1:
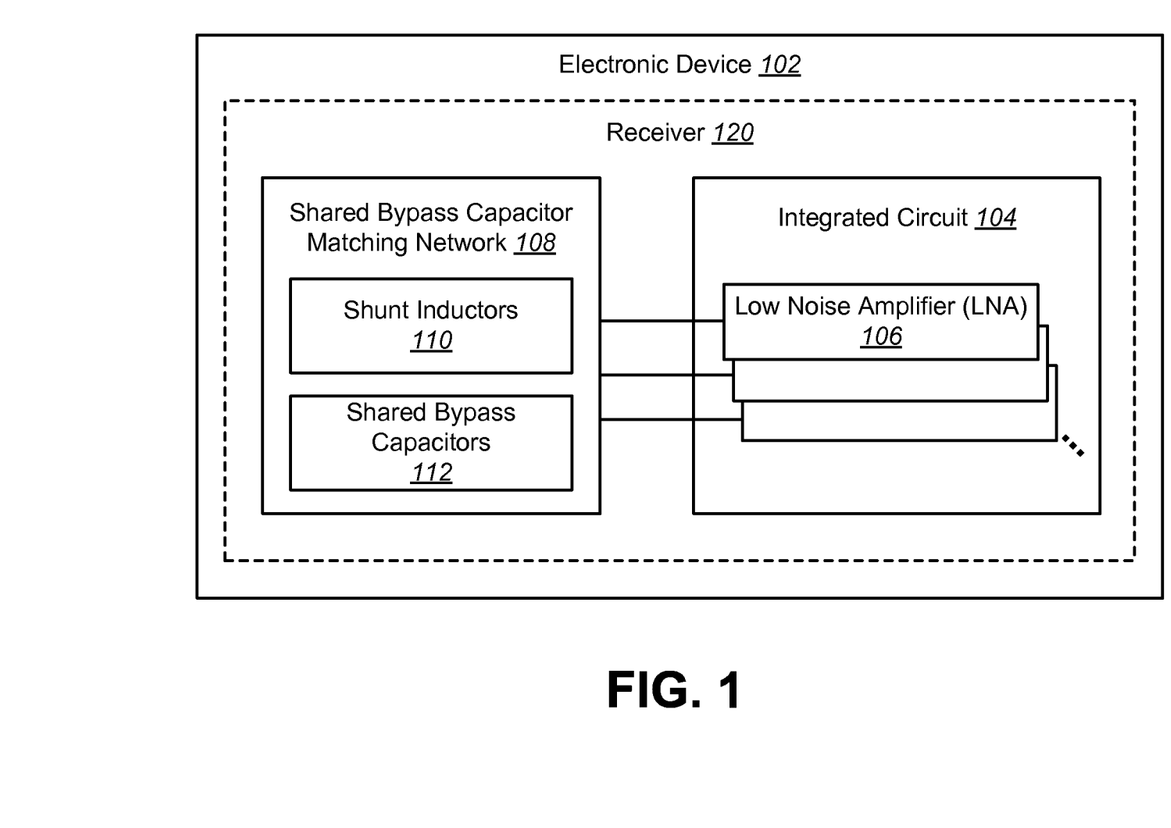
FIG. 1 is a block diagram of an electronic device for use in the present systems and methods.

FIG. 1 is a block diagram of an electronic device 102 for use in the present systems and methods. The electronic device 102 may be a base station, a wireless communication device, or other device that uses electricity. The electronic device 102 may include a radio frequency (RF) receiver 120. The receiver 120 may include an integrated circuit 104 with multiple low noise amplifiers (LNAs) 106. The integrated circuit 104 may include a combination of highband low noise amplifiers (LNAs) 106, midband low noise amplifiers (LNAs) 106 and lowband low noise amplifiers (LNAs) 106. In one configuration, the integrated circuit 104 may include ten low noise amplifiers (LNAs) 106. The receiver 120 may also include a shared bypass capacitor matching network 108. Two or more of the low noise amplifiers (LNAs) 106 on the integrated circuit 104 may be coupled to the shared bypass capacitor matching network 108. In one configuration, all of the low noise amplifiers (LNAs) 106 on the integrated circuit 104 may be coupled to the shared bypass capacitor matching network 108.

Receivers 120 may include matching networks. A matching network may use impedance matching to match the output impedance of a signal source to the input impedance of an electrical load. Impedance matching may maximize the power transfer and/or minimize reflections from the load. In a receiver 120, a matching network may be needed between an antenna and a low noise amplifier (LNA) 106.

Matching circuit design often involves multiple inductor components. Inductors are passive devices; as integrated circuit process sizes decrease, the sizes of passive devices remain the same. Thus, in smaller integrated circuit process sizes, inductors may dominate the die area used. The large form factor of inductors makes integration onto planar technology infeasible. Thus, a matching network (such as the shared bypass capacitor matching network 108) may not be included on an integrated circuit 104. A matching network may use capacitors and inductors in different combinations to match the impedance between a source and a load.

A matching network may be used for low noise amplifiers (LNAs) 106 that are differential ended (DE) and low noise amplifiers (LNAs) 106 that are single ended (SE). For each differential ended (DE) low noise amplifier (LNA) 106, there may be three impedance matching components in the matching network. Also, for each single ended (SE) low noise amplifier (LNA) 106, there may be three impedance matching components in the matching network. Some electronic devices 102 may use an integrated circuit 104 with ten or more low noise amplifiers (LNAs) 106. The matching network may thus include a large number of inductors and/or capacitors. For example, for an integrated circuit 104 with ten low noise amplifiers (LNAs) 106, a matching network may include thirty impedance matching components. By reducing the number of impedance matching components in a matching network, the cost of an electronic device 102 may be reduced. One such way to reduce the number of impedance matching components in a matching network is to use shared bypass capacitors 112 in a shared bypass capacitor matching network 108. A shared bypass capacitor 112 may be shared between two or more low noise amplifiers (LNAs) 106. In one configuration, a shared bypass capacitor 112 may be shared between all the low noise amplifiers (LNAs) 106 on an integrated circuit 104. The shared bypass capacitor matching network 108 may also include shunt inductors 110 for each low noise amplifier (LNA) 106.

Figure 2:
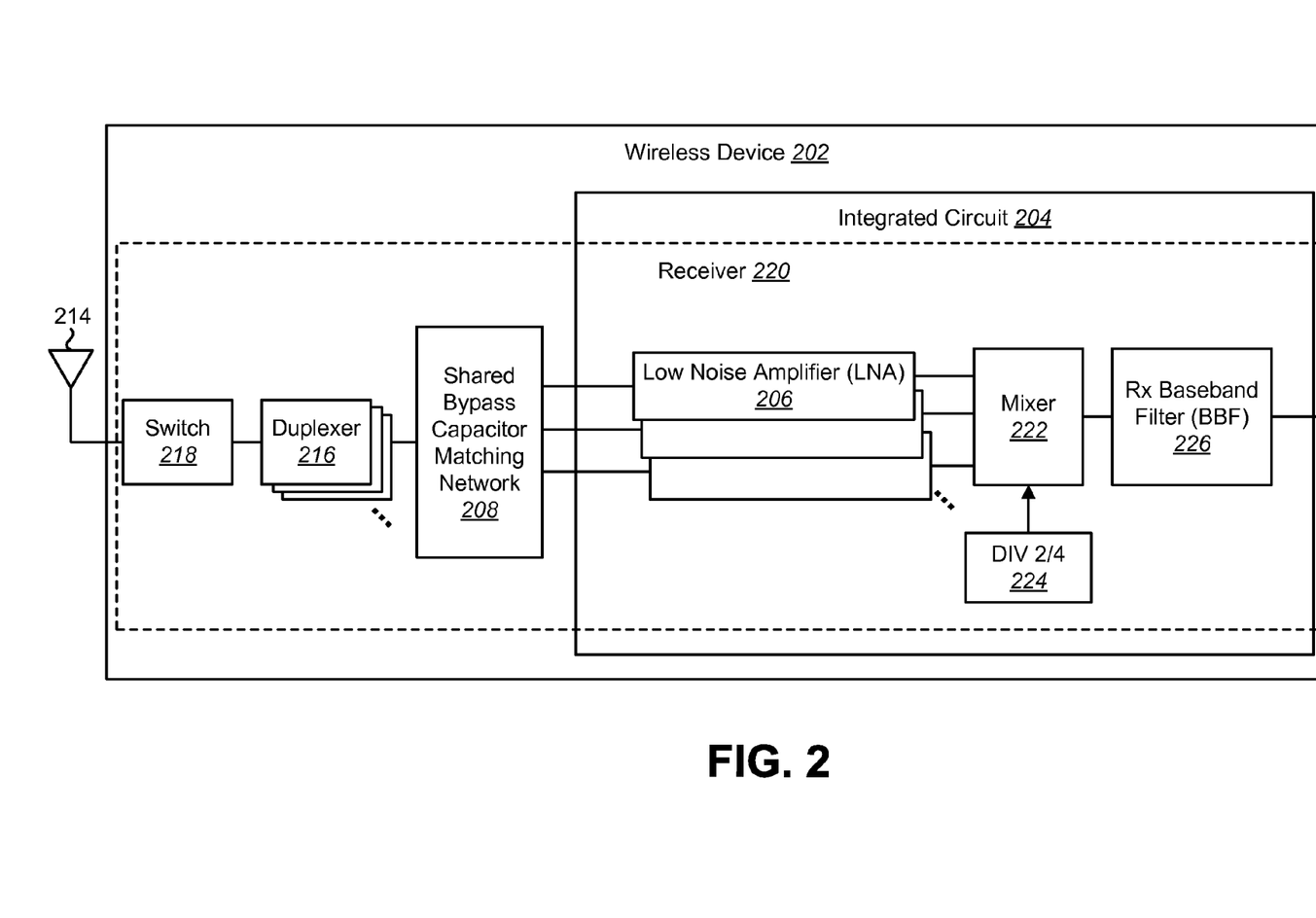
FIG. 2 is a block diagram of a wireless device for use in the present systems and methods.

FIG. 2 is a block diagram of a wireless device 202 for use in the present systems and methods. The wireless device 202 of FIG. 2 may be one configuration of the electronic device 102 of FIG. 1. The wireless device 202 may be a base station or a wireless communication device.

The wireless device 202 may include an antenna 214. The wireless device 202 may use the antenna 214 to receive multiband signals. The wireless device 202 may include multiple duplexers 216. Each duplexer 216 may be used for a different band. A switch 218 may be coupled between the duplexers 216 and the antenna 214 to ensure that the appropriate duplexer 216 is coupled to the antenna 214 (depending on the receiving band). The switch 218 may allow the wireless device 202 to switch signals output from the antenna 214 to the appropriate duplexer 216 and low noise amplifier (LNA) 206 on an integrated circuit 204 on the wireless device 202. An impedance matching network may be needed between the antenna 214 and the low noise amplifiers (LNAs) 206.

The wireless device 202 may include a shared bypass capacitor matching network 208 coupled to the duplexers 216. The shared bypass capacitor matching network 208 may be an impedance matching network. The shared bypass capacitor matching network 208 may include shunt inductors 110 and shared bypass capacitors 112. By using shared bypass capacitors 112, the number of bypass capacitors in the matching network may be reduced, reducing the total cost of the wireless device 202. For example, if using shared bypass capacitors 112 reduces the number of bypass capacitors by four, the cost savings achieved may include the saved cost of the four bypass capacitors and the saved board area (which may be approximately ten times the cost of the components).

The shared bypass capacitor matching network 208 may be coupled to one or more low noise amplifiers (LNAs) 206 on the integrated circuit 204 of the wireless device 202. In one configuration, each of the low noise amplifiers (LNAs) 206 may be used for a different band. The low noise amplifiers (LNAs) 206 may be coupled to a mixer 222 on the integrated circuit 204. The mixer 222 may receive a downconverting frequency from a DIV 2/4 stage 224 that is used to downconvert signals received from a low noise amplifier (LNA) 206 to the baseband frequency. The mixer 222 may be coupled to a receiver (Rx) baseband filter 226 on the integrated circuit 204. The shared bypass capacitor matching network 208, low noise amplifiers (LNAs) 206, mixer 222, DIV 2/4 stage 224 and receiver (Rx) baseband filter 226 may be part of a receiver 220 on the wireless device 202.

Figure 3:
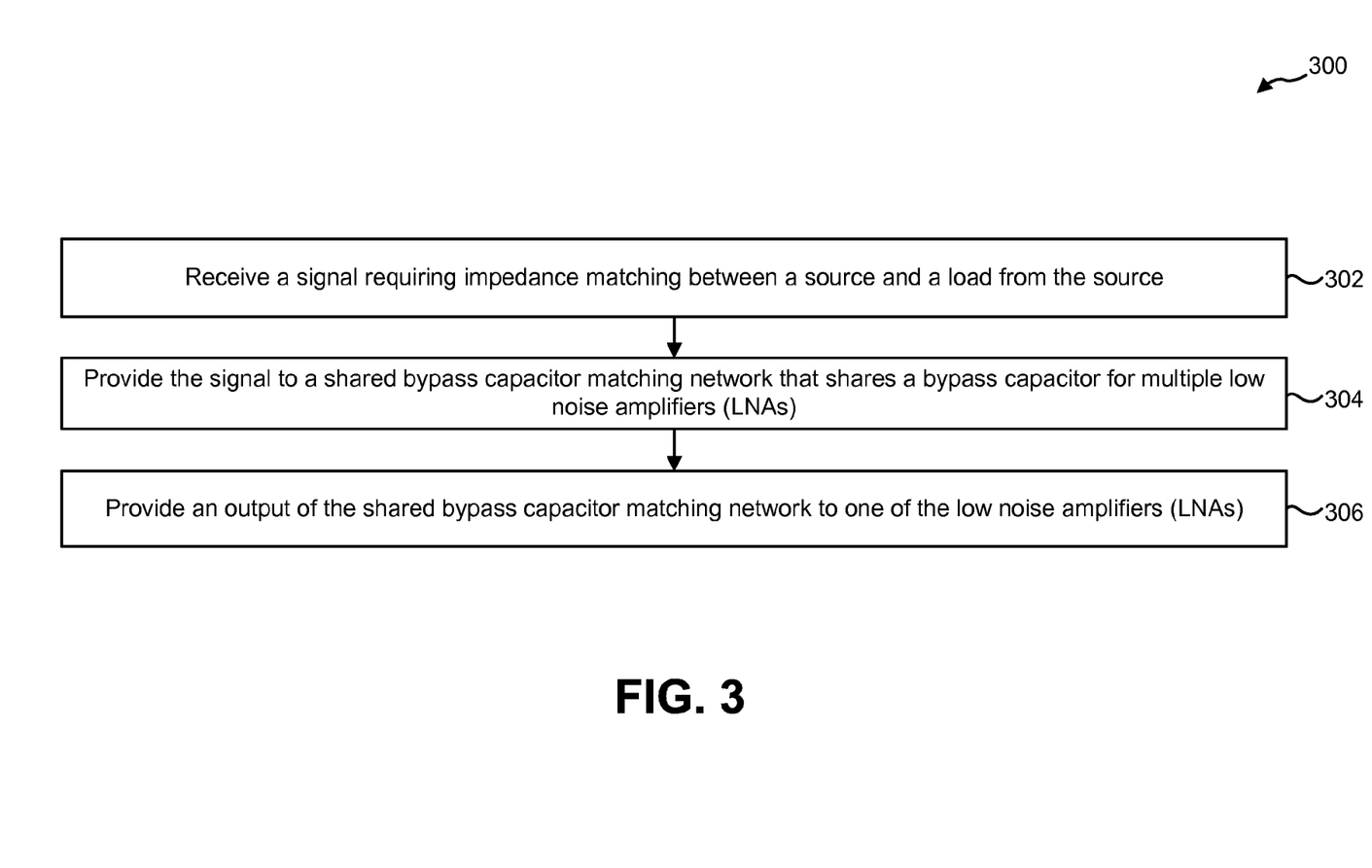
FIG. 3 is a flow diagram of a method for impedance matching using a shared bypass capacitor matching network.

FIG. 3 is a flow diagram of a method 300 for impedance matching using a shared bypass capacitor matching network 108. The method 300 may be performed on an electronic device 102. The electronic device 102 may receive 302 a signal requiring impedance matching between a source and a load from the source. The electronic device 102 may provide 304 the signal to a shared bypass capacitor matching network 108 that shares a bypass capacitor 112 for multiple low noise amplifiers (LNAs) 106. One of the low noise amplifiers (LNAs) 106 may be the load. The electronic device 102 may then provide 306 an output of the shared bypass capacitor matching network 108 to one of the low noise amplifiers (LNAs) 106.

Figure 4:
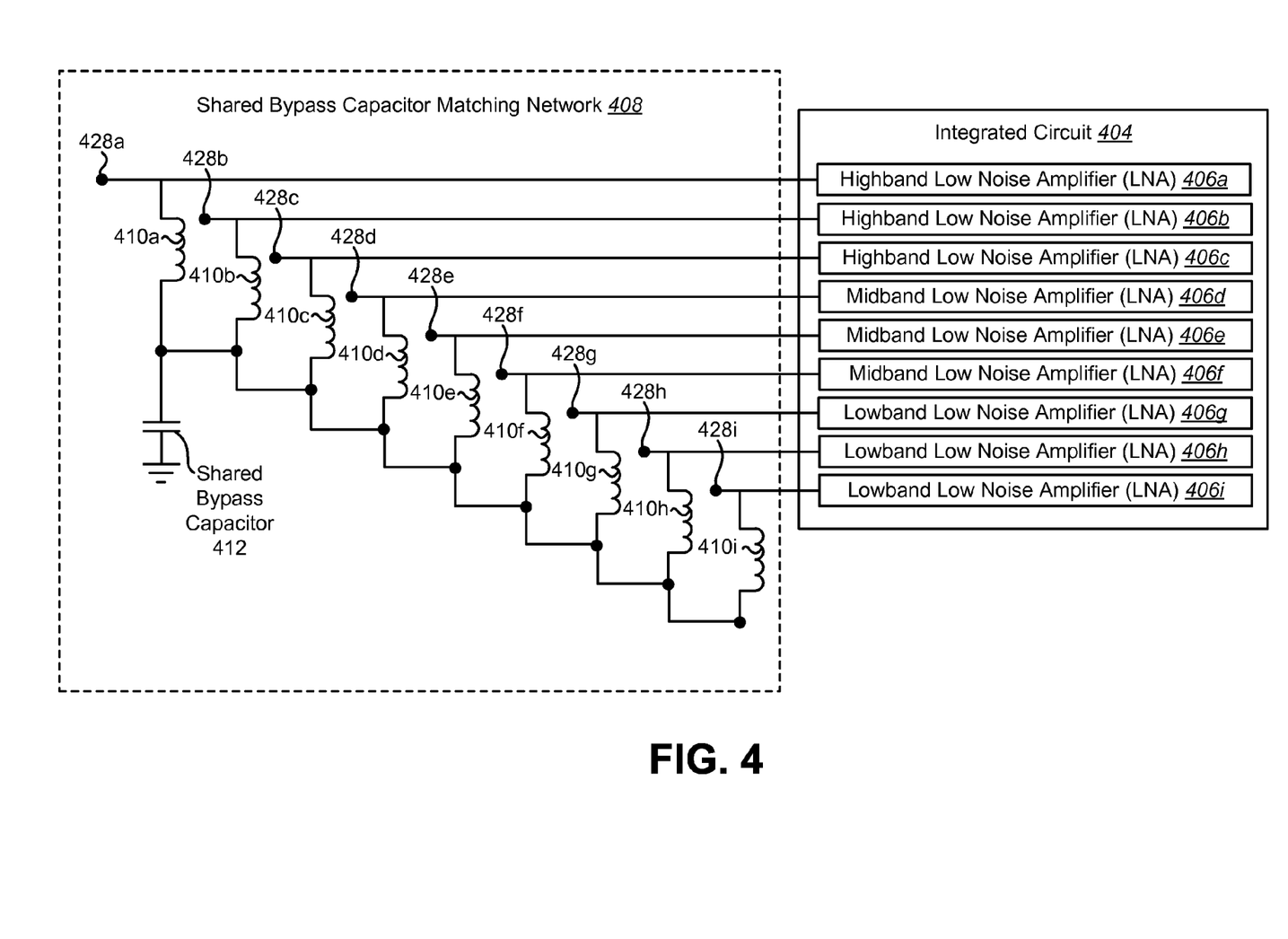
FIG. 4 is a block diagram illustrating one configuration of a shared bypass capacitor matching network coupled to an integrated circuit.

FIG. 4 is a block diagram illustrating one configuration of a shared bypass capacitor matching network 408 coupled to an integrated circuit 404. The shared bypass capacitor matching network 408 of FIG. 4 may be one configuration of the shared bypass capacitor matching network 108 of FIG. 1. The integrated circuit 404 of FIG. 4 may be one configuration of the integrated circuit 104 of FIG. 1. The integrated circuit 404 may include a first highband low noise amplifier (LNA) 406a, a second highband low noise amplifier (LNA) 406b, a third highband low noise amplifier (LNA) 406c, a first midband low noise amplifier (LNA) 406d, a second midband low noise amplifier (LNA) 406e, a third midband low noise amplifier (LNA) 406f, a first lowband low noise amplifier (LNA) 406g, a second lowband low noise amplifier (LNA) 406h and a third lowband low noise amplifier (LNA) 406i. In the configuration shown, each of the highband low noise amplifiers (LNAs) 406a-c, midband low noise amplifiers (LNAs) 406d-f and lowband low noise amplifiers (LNAs) 406g-i may share a single shared bypass capacitor 412.

The first highband low noise amplifier (LNA) 406a may be coupled to a first highband input 428a. The first highband input 428a may be coupled to a duplexer 216 for the highband. The first highband low noise amplifier (LNA) 406a may also be coupled to an inductor 410a. The inductor 410a may be a shunt inductor 110. The shared bypass capacitor 412 may be coupled between the inductor 410a and ground. The second highband low noise amplifier (LNA) 406b may be coupled to a second highband input 428b. The second highband input 428b may be coupled to a duplexer 216 for the highband. The second highband low noise amplifier (LNA) 406b may also be coupled to an inductor 410b. The inductor 410b may be a shunt inductor 110. The inductor 410b may also be coupled to the shared bypass capacitor 412. The third highband low noise amplifier (LNA) 406c may be coupled to a third highband input 428c. The third highband input 428c may be coupled to a duplexer 216 for the highband. The third highband low noise amplifier (LNA) 406c may be coupled to an inductor 410c. The inductor 410c may be a shunt inductor 110. The inductor 410c may also be coupled to the shared bypass capacitor 412. In one configuration, the first highband low noise amplifier (LNA) 406a, the second highband low noise amplifier (LNA) 406b and the third highband low noise amplifier (LNA) 406c may each represent different portions of the high band. Each of the highband low noise amplifiers (LNAs) 406a-c may be coupled to a different duplexer 216.

The first midband low noise amplifier (LNA) 406d may be coupled to a first midband input 428d. The first midband input 428d may be coupled to a duplexer 216 for the midband. The first midband low noise amplifier (LNA) 406d may also be coupled to an inductor 410d. The inductor 410d may be a shunt inductor 110. The inductor 410d may be coupled to the shared bypass capacitor 412. The second midband low noise amplifier (LNA) 406e may be coupled to a second midband input 428e. The second midband input 428e may also be coupled to a duplexer 216 for the midband. The second midband low noise amplifier (LNA) 406e may also be coupled to an inductor 410e. The inductor 410e may be a shunt inductor 110. The inductor 410e may also be coupled to the shared bypass capacitor 412. The third midband low noise amplifier (LNA) 406f may be coupled to a third midband input 428f. The third midband input 428f may be coupled to a duplexer 216 for the midband. The third midband low noise amplifier (LNA) 406f may be coupled to an inductor 410f. The inductor 410f may be a shunt inductor 110. The inductor 410f may also be coupled to the shared bypass capacitor 412. In one configuration, the first midband low noise amplifier (LNA) 406d, the second midband low noise amplifier (LNA) 406e and the third midband low noise amplifier (LNA) 406f may each represent different portions of the midband. Each of the midband low noise amplifiers (LNAs) 406d-f may be coupled to a different duplexer 216.

The first lowband low noise amplifier (LNA) 406g may be coupled to a first lowband input 428g. The first lowband input 428g may be coupled to a duplexer 216 for the lowband. The first lowband low noise amplifier (LNA) 406g may also be coupled to an inductor 410g. The inductor 410g may be a shunt inductor 110. The inductor 410g may be coupled to the shared bypass capacitor 412. The second lowband low noise amplifier (LNA) 406h may be coupled to a second lowband input 428h. The second lowband input 428h may also be coupled to a duplexer 216 for the lowband. The second lowband low noise amplifier (LNA) 406h may also be coupled to an inductor 410h. The inductor 410h may be a shunt inductor 110. The inductor 410h may also be coupled to the shared bypass capacitor 412. The third lowband low noise amplifier (LNA) 406i may be coupled to a third lowband input 428i. The third lowband input 428i may be coupled to a duplexer 216 for the low. The third lowband low noise amplifier (LNA) 406i may be coupled to an inductor 410i. The inductor 410i may be a shunt inductor 110. The inductor 410i may also be coupled to the shared bypass capacitor 412. Thus, each of the low noise amplifiers (LNAs) 406 may share a single shared bypass capacitor 412. In one configuration, the first lowband low noise amplifier (LNA) 406g, the second lowband low noise amplifier (LNA) 406h and the third lowband low noise amplifier (LNA) 406i may each represent different portions of the lowband. Each of the lowband low noise amplifiers (LNAs) 406g-i may be coupled to a different duplexer 216.

To prevent a DC voltage at the node 428a from biasing the low noise amplifiers (LNAs) 406 that share the shared bypass capacitor 412, each low noise amplifier (LNA) 406 may include an internal switch, which can be used to prevent this DC biasing.

Figure 5:
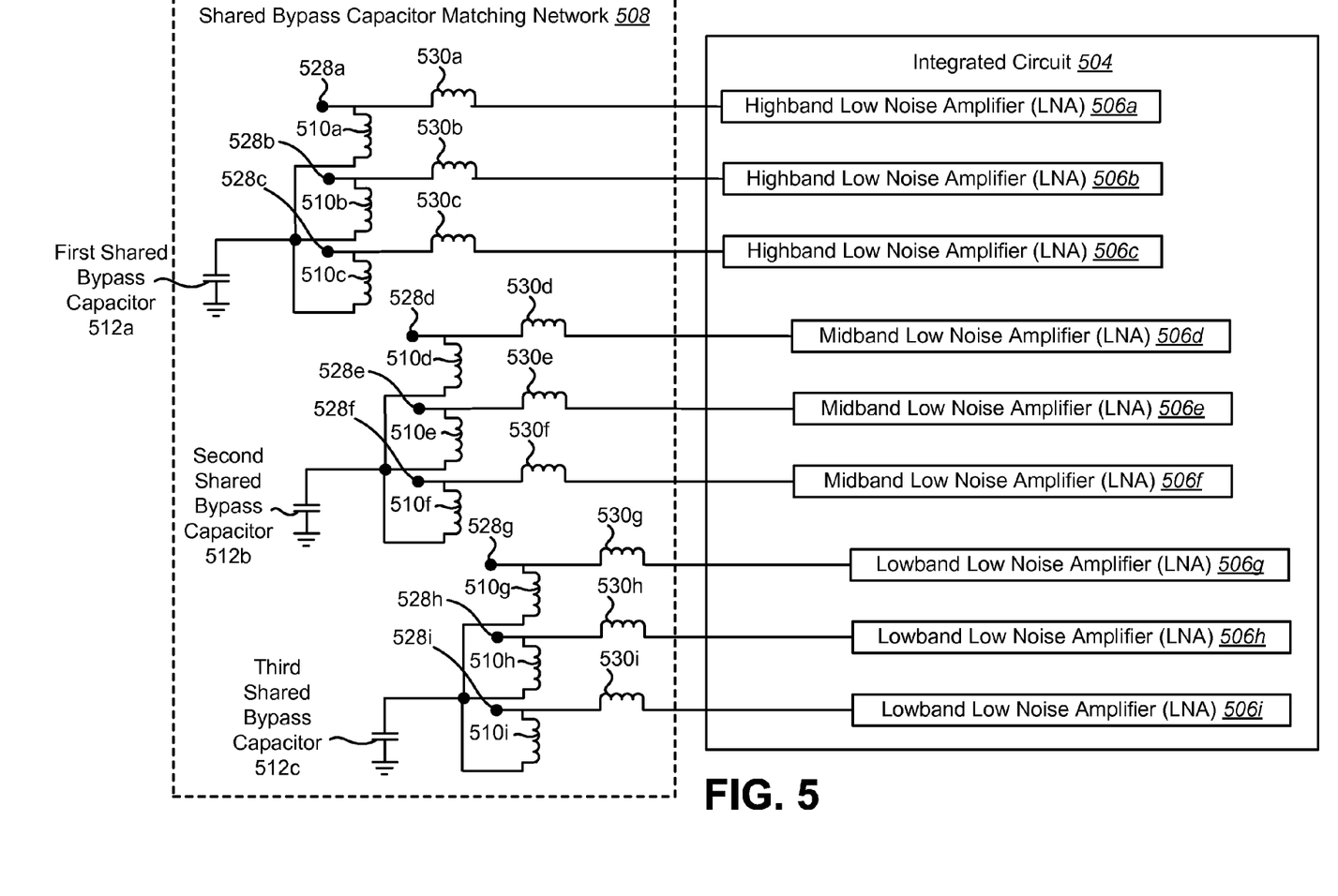
FIG. 5 is block diagram illustrating another configuration of a shared bypass capacitor matching network coupled to an integrated circuit.

FIG. 5 is block diagram illustrating another configuration of a shared bypass capacitor matching network 508 coupled to an integrated circuit 504. The shared bypass capacitor matching network 508 of FIG. 5 may be one configuration of the shared bypass capacitor matching network 108 of FIG. 1. The integrated circuit 504 of FIG. 5 may be one configuration of the integrated circuit 104 of FIG. 1. The integrated circuit 504 may include a first highband low noise amplifier (LNA) 506a, a second highband low noise amplifier (LNA) 506b, a third highband low noise amplifier (LNA) 506c, a first midband low noise amplifier (LNA) 506d, a second midband low noise amplifier (LNA) 506e, a third midband low noise amplifier (LNA) 506f, a first lowband low noise amplifier (LNA) 506g, a second lowband low noise amplifier (LNA) 506h and a third lowband low noise amplifier (LNA) 506i. The shared bypass capacitor matching network 508 may include a first shared bypass capacitor 512a, a second shared bypass capacitor 512b and a third shared bypass capacitor 512c. In the configuration shown, each of the highband low noise amplifiers (LNAs) 506a-c may share the first shared bypass capacitor 512a, each of the midband low noise amplifiers (LNAs) 506d-f may share the second shared bypass capacitor 512b and each of the lowband low noise amplifiers (LNAs) 506g-i may share the third shared bypass capacitor 512c.

An inductor 530a may be coupled between the first highband low noise amplifier (LNA) 506a and a first highband input 528a. The first highband input 528a may be coupled to a duplexer 216. A shunt inductor 510a may be coupled between the first highband input 528a and the first shared bypass capacitor 512a. The first shared bypass capacitor 512a may also be coupled to ground. An inductor 530b may be coupled between the second highband low noise amplifier (LNA) 506b and a second highband input 528b. The second highband input 528b may be coupled to a duplexer 216. A shunt inductor 510b may be coupled between the second highband input 528b and the first shared bypass capacitor 512a. An inductor 530c may be coupled between the third highband low noise amplifier (LNA) 506c and a third highband input 528c. The third highband input 528c may be coupled to a duplexer 216. A shunt inductor 510c may be coupled between the third highband input 528c and the first shared bypass capacitor 512a. Each of the highband low noise amplifiers (LNAs) 506a-c may be coupled to a different duplexer 216.

An inductor 530d may be coupled between the first midband low noise amplifier (LNA) 506d and a first midband input 528d. The first midband input 528d may be coupled to a duplexer 216. A shunt inductor 510d may be coupled between the first midband input 528d and the second shared bypass capacitor 512b. The second shared bypass capacitor 512b may also be coupled to ground. An inductor 530e may be coupled between the second midband low noise amplifier (LNA) 506e and a second midband input 528e. The second midband input 528e may be coupled to a duplexer 216. A shunt inductor 510e may be coupled between the second midband input 528e and the second shared bypass capacitor 512b. An inductor 530f may be coupled between the third midband low noise amplifier (LNA) 506f and a third midband input 528f. The third midband input 528f may be coupled to a duplexer 216. A shunt inductor 510f may be coupled between the third midband input 528f and the second shared bypass capacitor 512b. Each of the midband low noise amplifiers (LNAs) 506d-f may be coupled to a different duplexer 216.

An inductor 530g may be coupled between the first lowband low noise amplifier (LNA) 506g and a first lowband input 528g. The first lowband input 528g may be coupled to a duplexer 216. A shunt inductor 510g may be coupled between the first lowband input 528g and the third shared bypass capacitor 512c. The third shared bypass capacitor 512c may also be coupled to ground. An inductor 530h may be coupled between the second lowband low noise amplifier (LNA) 506h and a second lowband input 528h. The second lowband input 528h may be coupled to a duplexer 216. A shunt inductor 510h may be coupled between the second lowband input 528h and the third shared bypass capacitor 512c. An inductor 530i may be coupled between the third lowband low noise amplifier (LNA) 506i and a third lowband input 528i. The third lowband input 528i may be coupled to a duplexer 216. A shunt inductor 510i may be coupled between the third lowband input 528i and the third shared bypass capacitor 512c. Each of the lowband low noise amplifiers (LNAs) 506g-i may be coupled to a different duplexer 216.

Figure 6:
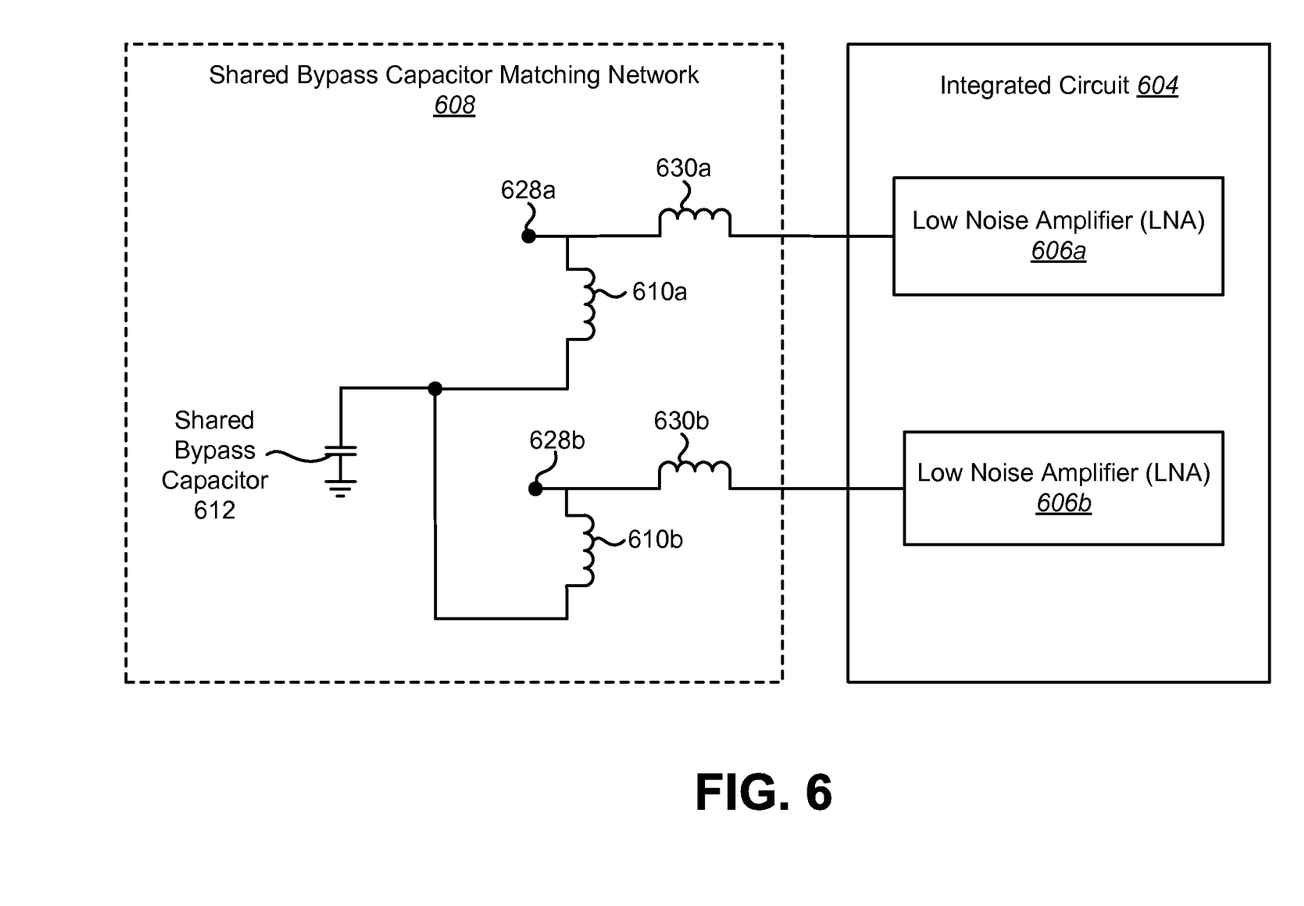
FIG. 6 is block diagram illustrating yet another configuration of a shared bypass capacitor matching network coupled to an integrated circuit.

FIG. 6 is a block diagram illustrating yet another configuration of a shared bypass capacitor matching network 608 coupled to an integrated circuit 604. The shared bypass capacitor matching network 608 of FIG. 6 may be one configuration of the shared bypass capacitor matching network 108 of FIG. 1. The integrated circuit 604 of FIG. 6 may be one configuration of the integrated circuit 104 of FIG. 1. The integrated circuit 604 may include a first low noise amplifier (LNA) 606a and a second low noise amplifier (LNA) 606b. The shared bypass capacitor matching network 608 may include a shared bypass capacitor 612, a first shunt inductor 610a, a second shunt inductor 610b, a first inductor 630a and a second inductor 630b.

The first inductor 630a may be coupled between a first low noise amplifier (LNA) input 628a and the first low noise amplifier (LNA) 606a. The first shunt inductor 610a may be coupled between the first low noise amplifier (LNA) input 628a and the shared bypass capacitor 612. The shared bypass capacitor 612 may also be coupled to ground. The second inductor 630b may be coupled between a second low noise amplifier (LNA) input 628b and the second low noise amplifier (LNA) 606b. The second shunt inductor 610b may be coupled between the second low noise amplifier (LNA) input 628b and the shared bypass capacitor 612.

Figure 7:
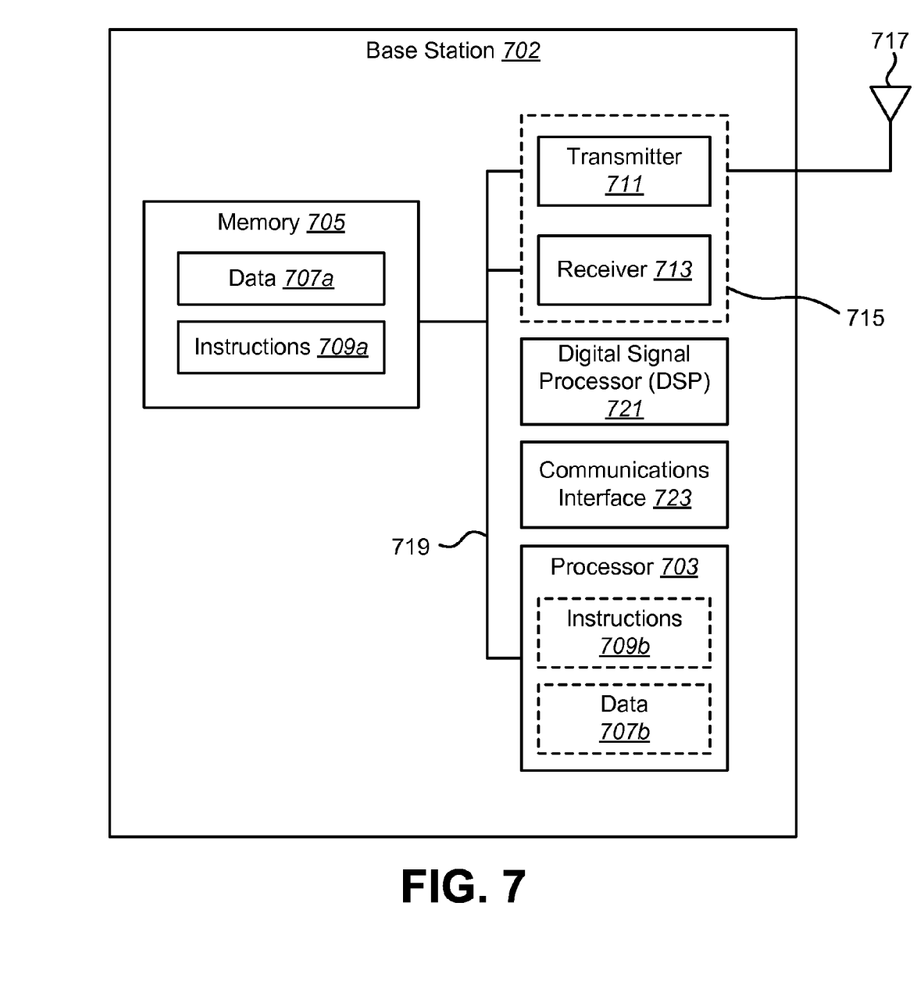
FIG. 7 illustrates certain components that may be included within a base station.

FIG. 7 illustrates certain components that may be included within a base station 702. A base station may also be referred to as, and may include some or all of the functionality of, an access point, a broadcast transmitter, a NodeB, an evolved NodeB, etc. The base station 702 includes a processor 703. The processor 703 may be a general purpose single- or multi-chip microprocessor (e.g., an ARM), a special purpose microprocessor (e.g., a digital signal processor (DSP)), a microcontroller, a programmable gate array, etc. The processor 703 may be referred to as a central processing unit (CPU). Although just a single processor 703 is shown in the base station 702 of FIG. 7, in an alternative configuration, a combination of processors (e.g., an ARM and DSP) could be used.

The base station 702 also includes memory 705. The memory 705 may be any electronic component capable of storing electronic information. The memory 705 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 707a and instructions 709a may be stored in the memory 705. The instructions 709a may be executable by the processor 703 to implement the methods disclosed herein. Executing the instructions 709a may involve the use of the data 707a that is stored in the memory 705. When the processor 703 executes the instructions 709a, various portions of the instructions 709b may be loaded onto the processor 703, and various pieces of data 707b may be loaded onto the processor 703.

The base station 702 may also include a transmitter 711 and a receiver 713 to allow transmission and reception of signals to and from the base station 702. The transmitter 711 and receiver 713 may be collectively referred to as a transceiver 715. An antenna 717 may be electrically coupled to the transceiver 715. The base station 702 may also include (not shown) multiple transmitters, multiple receivers, multiple transceivers and/or multiple antennas.

The base station 702 may include a digital signal processor (DSP) 721. The base station 702 may also include a communications interface 723. The communications interface 723 may allow a user to interact with the base station 702.

The various components of the base station 702 may be coupled together by one or more buses, which may include a power bus, a control signal bus, a status signal bus, a data bus, etc. For the sake of clarity, the various buses are illustrated in FIG. 7 as a bus system 719.

Figure 8:
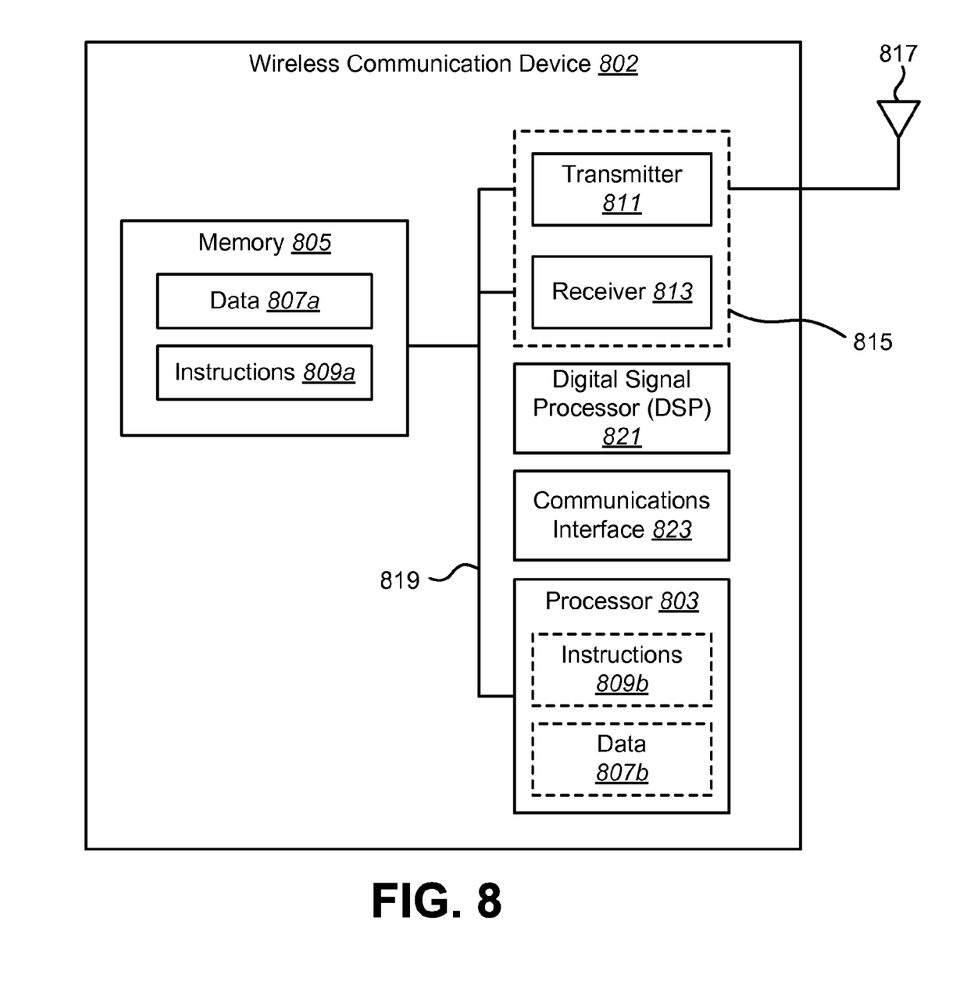
FIG. 8 illustrates certain components that may be included within a wireless communication device.

FIG. 8 illustrates certain components that may be included within a wireless communication device 802. The wireless communication device 802 may be an access terminal, a mobile station, a user equipment (UE), etc. The wireless communication device 802 includes a processor 803. The processor 803 may be a general purpose single- or multi-chip microprocessor (e.g., an ARM), a special purpose microprocessor (e.g., a digital signal processor (DSP)), a microcontroller, a programmable gate array, etc. The processor 803 may be referred to as a central processing unit (CPU). Although just a single processor 803 is shown in the wireless communication device 802 of FIG. 8, in an alternative configuration, a combination of processors (e.g., an ARM and DSP) could be used.

The wireless communication device 802 also includes memory 805. The memory 805 may be any electronic component capable of storing electronic information. The memory 805 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 807a and instructions 809a may be stored in the memory 805. The instructions 809a may be executable by the processor 803 to implement the methods disclosed herein. Executing the instructions 809a may involve the use of the data 807a that is stored in the memory 805. When the processor 803 executes the instructions 809a, various portions of the instructions 809b may be loaded onto the processor 803, and various pieces of data 807b may be loaded onto the processor 803.

The wireless communication device 802 may also include a transmitter 811 and a receiver 813 to allow transmission and reception of signals to and from the wireless communication device 802. The transmitter 811 and receiver 813 may be collectively referred to as a transceiver 815. An antenna 817 may be electrically coupled to the transceiver 815. The wireless communication device 802 may also include (not shown) multiple transmitters, multiple receivers, multiple transceivers and/or multiple antennas.

The wireless communication device 802 may include a digital signal processor (DSP) 821. The wireless communication device 802 may also include a communications interface 823. The communications interface 823 may allow a user to interact with the wireless communication device 802.

The various components of the wireless communication device 802 may be coupled together by one or more buses, which may include a power bus, a control signal bus, a status signal bus, a data bus, etc. For the sake of clarity, the various buses are illustrated in FIG. 8 as a bus system 819.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL) or wireless technologies such as infrared, radio and microwave, then the coaxial cable, fiber optic cable, twisted pair, DSL or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIG. 3, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A receiver, comprising:
   a first amplifier on an integrated circuit;
   a second amplifier on the integrated circuit;
   a first inductor coupled to the first amplifier;
   a second inductor coupled to the second amplifier; and
   a first capacitor coupled to the first inductor, the second inductor, and to ground, wherein the first capacitor is shared between a first matching network for the first amplifier and a second matching network for the second amplifier, wherein each matching network provides impedance matching to match an output impedance of a signal source for each amplifier, and wherein each matching network provides impedance matching to match an output impedance of a signal source for each amplifier, wherein the first inductor and the second inductor are shunt inductors.

2. The receiver of claim 1, wherein the first capacitor is a shared bypass capacitor.

3. The receiver of claim 1, wherein a first input is coupled to the first amplifier, and wherein a second input is coupled to the second amplifier.

4. The receiver of claim 3, wherein the first input is coupled to a first duplexer, and wherein the second input is coupled to a second duplexer.

5. The receiver of claim 4, wherein the first duplexer and the second duplexer are coupled to an antenna via a switch.

6. The receiver of claim 1, further comprising:
   a third inductor, wherein the third inductor is coupled between a first input and the first amplifier; and a fourth inductor, wherein the fourth inductor is coupled between a second input and the second amplifier.

7. The receiver of claim 1, wherein the first amplifier is a low noise amplifier, and wherein the second amplifier is a low noise amplifier.

8. The receiver of claim 1, wherein the first amplifier is one of a highband low noise amplifier, a midband low noise amplifier, and a lowband low noise amplifier, and wherein the second amplifier is one of a highband low noise amplifier, a midband low noise amplifier, and a lowband low noise amplifier.

9. The receiver of claim 1, wherein the receiver is part of a base station, and wherein the receiver is used to receive radio frequency signals.

10. The receiver of claim 1, wherein the receiver is part of a wireless communication device, and wherein the receiver is used to receive radio frequency signals.

11. The receiver of claim 1, wherein the first inductor, the second inductor and the first capacitor form an impedance matching network.

12. The receiver of claim 1, further comprising:
a third amplifier on the integrated circuit;
a fourth amplifier on the integrated circuit;
a third inductor coupled to the third amplifier;
a fourth inductor coupled to the fourth amplifier; and
a second capacitor coupled to the third inductor, the fourth inductor, and to ground.

13. A method for impedance matching in a receiver, comprising:
receiving a signal from a source, wherein the signal requires impedance matching between the source and a load;
providing the signal to an impedance matching network, wherein the impedance matching network shares a first capacitor for multiple amplifiers, wherein the impedance matching network provides impedance matching to match an output impedance of a signal source for the multiple amplifiers; and
providing an output of the impedance matching network to one of the amplifiers,
wherein the receiver comprises the amplifiers, a plurality of inductors, and the first capacitor, wherein each of the inductors is coupled to a corresponding amplifier and the first capacitor is coupled to the inductors and to ground, wherein the inductors are shunt inductors.

14. The method of claim 13, wherein the multiple amplifiers are on an integrated circuit, and wherein the first capacitor is a shared bypass capacitor.

15. The method of claim 13, wherein the method is performed by an electronic device.

16. The method of claim 15, wherein the electronic device comprises the receiver comprising:
a first amplifier on an integrated circuit;
a second amplifier on the integrated circuit;
a first inductor coupled to the first amplifier; and
a second inductor coupled to the second amplifier, wherein the first capacitor is coupled to the first inductor, the second inductor, and to ground, and wherein the first capacitor is shared between a first matching network for the first amplifier and a second matching network for the second amplifier.

17. The method of claim 16, wherein a first input is coupled to the first amplifier, and wherein a second input is coupled to the second amplifier.

18. The method of claim 17, wherein the first input is coupled to a first duplexer, and wherein the second input is coupled to a second duplexer.

19. The method of claim 18, wherein the first duplexer and the second duplexer are coupled to an antenna via a switch.

20. The method of claim 16, wherein the receiver further comprises:
a third inductor, wherein the third inductor is coupled between a first input and the first amplifier; and
a fourth inductor, wherein the fourth inductor is coupled between a second input and the second amplifier.

21. The method of claim 16, wherein the first amplifier is a low noise amplifier, and wherein the second amplifier is a low noise amplifier.

22. The method of claim 16, wherein the first amplifier is one of a highband low noise amplifier, a midband low noise amplifier, and a lowband low noise amplifier, and wherein the second amplifier is one of a highband low noise amplifier, a midband low noise amplifier, and a lowband low noise amplifier.

23. The method of claim 16, wherein the electronic device is a base station, and wherein the receiver is used to receive radio frequency signals.

24. The method of claim 16, wherein the electronic device is a wireless communication device, and wherein the receiver is used to receive radio frequency signals.

25. The method of claim 16, wherein the first inductor, the second inductor and the first capacitor form an impedance matching network.

26. The method of claim 16, wherein the receiver further comprises:
a third amplifier on the integrated circuit;
a fourth amplifier on the integrated circuit;
a third inductor coupled to the third amplifier;
a fourth inductor coupled to the fourth amplifier; and
a second capacitor coupled to the third inductor, the fourth inductor, and to ground.

27. An apparatus, comprising:
a receiver comprising a plurality of amplifiers, a plurality of inductors, and a first capacitor, wherein each of the inductors is coupled to a corresponding amplifier and the first capacitor is coupled to the inductors and to ground, wherein the first capacitor is shared between matching networks for the amplifiers, and wherein the inductors are shunt inductors;
means for receiving a signal from a source, wherein the signal requires impedance matching between the source and a load;
means for providing the signal to an impedance matching network, wherein the impedance matching network shares the first capacitor for the amplifiers, and wherein the impedance matching network provides impedance matching to match an output impedance of a signal source for the amplifiers; and
means for providing an output of the impedance matching network to one of the amplifiers.

28. The apparatus of claim 27, wherein the multiple amplifiers are on an integrated circuit, and wherein the first capacitor is a shared bypass capacitor.

29. The apparatus of claim 27, wherein the receiver comprises:
a first amplifier on an integrated circuit;
a second amplifier on the integrated circuit;
a first inductor coupled to the first amplifier; and
a second inductor coupled to the second amplifier, wherein the first capacitor is coupled to the first inductor, the second inductor, and to ground, and wherein the first capacitor is shared between a first matching network for the first amplifier and a second matching network for the second amplifier.

30. A computer-program product for impedance matching, the computer-program product comprising a non-transitory computer-readable medium having instructions thereon, the instructions comprising:

code for causing an electronic device to receive a signal from a source, wherein the signal requires impedance matching between the source and a load;

code for causing the electronic device to provide the signal to an impedance matching network, wherein the impedance matching network shares a first capacitor for multiple amplifiers, and wherein the impedance matching network provides impedance matching to match an output impedance of a signal source for the multiple amplifiers; and     code for causing the electronic device to provide an output of the impedance matching network to one of the amplifiers,     wherein the electronic device comprises a receiver comprising the amplifiers, a plurality of inductors, and the first capacitor, wherein each of the inductors is coupled to a corresponding amplifier and the first capacitor is coupled to the inductors and to ground, and wherein the inductors are shunt inductors.

31. The computer-program product of claim 30, wherein the multiple amplifiers are on an integrated circuit, and wherein the first capacitor is a shared bypass capacitor.

32. The computer-program product of claim 30, wherein the receiver comprises:

a first amplifier on an integrated circuit;

a second amplifier on the integrated circuit;

a first inductor coupled to the first amplifier; and a second inductor coupled to the second amplifier, wherein the first capacitor is coupled to the first inductor, the second inductor, and to ground, and wherein the first capacitor is shared between a first matching network for the first amplifier and a second matching network for the second amplifier.

* * * * *